United States Patent Office 3,444,965
Patented May 20, 1969

3,444,965
SHOCK ABSORBER AND PISTON
GUIDE MEANS
Joe W. Dobkins, Fort Worth, Tex., assignor to Halliburton Company, Duncan, Okla., a corporation of Delaware
Filed Sept. 29, 1967, Ser. No. 671,809
Int. Cl. F16d 57/00; F01b 31/00, 29/00
U.S. Cl. 188—96                                    4 Claims

ABSTRACT OF THE DISCLOSURE

A shock absorber which includes a cylinder defined by a cylinder wall having inner and outer peripheral surfaces and one open end defined by a free edge of the cylinder wall. A piston telescopingly received within the cylinder includes a high pressure end in engagement with a body of liquid and a low pressure end facing a cavity. Passage means in the piston means permits passage of fluid between the high pressure end and the low pressure end. Pressure responsive restrictor means connected with the piston means increase and decrease flow of fluid through the passage means during motion of the piston means away from and into the body of fluid respectively. Guiding means for guiding the piston axially of the cylinder includes an inner guide wall fixedly connected with the piston slidably abutting the inner surface of the cylinder wall and a concentric outer guide wall fixedly connected with the inner guide wall overlapping and telescopingly related to the outer surface of the cylinder wall. A window extends through the outer guide wall and the latter may be telescoped to align the window with a groove in the outer peripheral surfaces of the cylinder wall. A plurality of arcuate bearing segments are inserted separately through the window into the groove and extend from the groove into snug sliding contact with adjacent portions of the outer guide wall. The shock absorber also includes two oppositely facing, convexly curved, mounting surfaces one of which is connected with the piston means and the other with the cylinder means. The mounting surfaces are adapted to support the shock absorber between two vertically movable members to permit rolling and sliding movement of the shock absorber relative to the members.

BACKGROUND OF INVENTION

This invention relates to a shock absorber particularly suitable for stabilizing railway cars against lateral sway. In particular, it relates to a shock absorber of a type similar to that disclosed in the copending application of Orum E. Seay, Ser. No. 582,970, filed Sept. 29, 1966, and entitled "Side Sway Stabilizer for Railway Cars."

One form of shock absorber particularly suitable for stabilizing railway cars against lateral sway is disclosed in the above-identified Seay application. Certain portions of the disclosure of that application relating to the general background of the invention, the method of mounting the shock absorber in adjacent railway car structure, various details of the external configuration of the shock absorber and the unique advantages provided by a shock absorber of the type disclosed in the Seay application, apply equally to the shock absorber of the present invention. Insofar as these aspects of the disclosure are relevant to the present invention they are considered to be included herein by reference to the aforementioned Seay application Ser. No. 582,970.

The present shock absorber is, however, provided with modified guiding structure for the working elements intended to stabilize the relative motions thereof during damping action, against unwanted, non-axial motions likely to cause binding or gouging of the working elements in a particularly effective manner. The shock absorber is also intended to prove particularly rugged and longlasting under the severe operational conditions encountered in utilizing railway equipment.

In addition, modified damping structure capable of ensuring uniform and controlled operation of the shock absorber under load is provided.

Within the field of railway car side sway stabilizers of this particular type, the present invention is particularly intended for commercial exploitation by virtue of such advantages as ease of manufacture and reduced number of parts.

SUMMARY OF INVENTION

The invention provides a shock absorber intended for use in stabilizing railway cars against lateral sway. The shock absorber is of the type comprising a cylinder closed at one end to define a liquid filled chamber. An axially movable piston is moveably mounted in the chamber and provided with a restricted passage so as to provide damping action during collapsing motion of the shock absorber. The shock absorber is provided with oppositely facing, convexly curved mounting surfaces, one of which is fixedly connected with the piston and the other to the cylinder. Restoring spring means mounted between the mounting surfaces urge them apart to restore the shock absorber to a neutral position under no-load conditions. The mounting surfaces are adapted to be positioned between two relatively movable members whose motion is to be damped, and to permit rolling and sliding motion of the ends of the shock absorber relative to the members.

In an important aspect of the present invention, stabilizing means for guiding the piston axially relative to the cylinder during damping motion includes a shroud fixedly connected with the piston. The shroud includes an inner wall secured to the piston extending outwardly of the cylinder in sliding abutting contact with the interior surface of the cylinder wall. An outer wall fixedly connected with the free extremity of the inner wall overlaps and is spaced from the outer surface of the cylinder. A window extending through the outer guide wall may be aligned with an annular groove provided in the outer surface of the cylinder wall to permit a plurality of bearing segments to be inserted separately through the window into the groove. Subsequent to mounting the bearing segments have their outer surfaces slidingly abutting the outer wall of the shroud to provide additional guiding support therefor during telescoping motion.

A further aspect of the invention resides in the provision of a pressure responsive restrictor including a valve head supported on a rod which extends axially through the piston for motion relative thereto. In one position with the piston moving into the liquid the valve head abuts the piston to close off entrance to a plurality of channels extending axially through the piston. At this time a restricted flow of liquid passes through from one side of the piston to the other through a restricting orifice mounted in the rod to provide damping.

Motion of the piston in the other direction during restoring motion when the load is removed, causes the valve head to move away from the piston uncovering the channels and permitting virtually unrestricted flow therethrough.

In a method aspect of the invention, the bearing segments are mounted in the groove by aligning a window provided in the outer wall of the shroud with the annular groove and then passing the bearing segments individually through the window to be successively mounted in the groove. Subsequent to mounting of the bearing segments, the window is closed and sealed.

DRAWING

One preferred embodiment of the invention is illustrated in the accompanying drawings in which.

DETAILED DESCRIPTION

Figure 1:
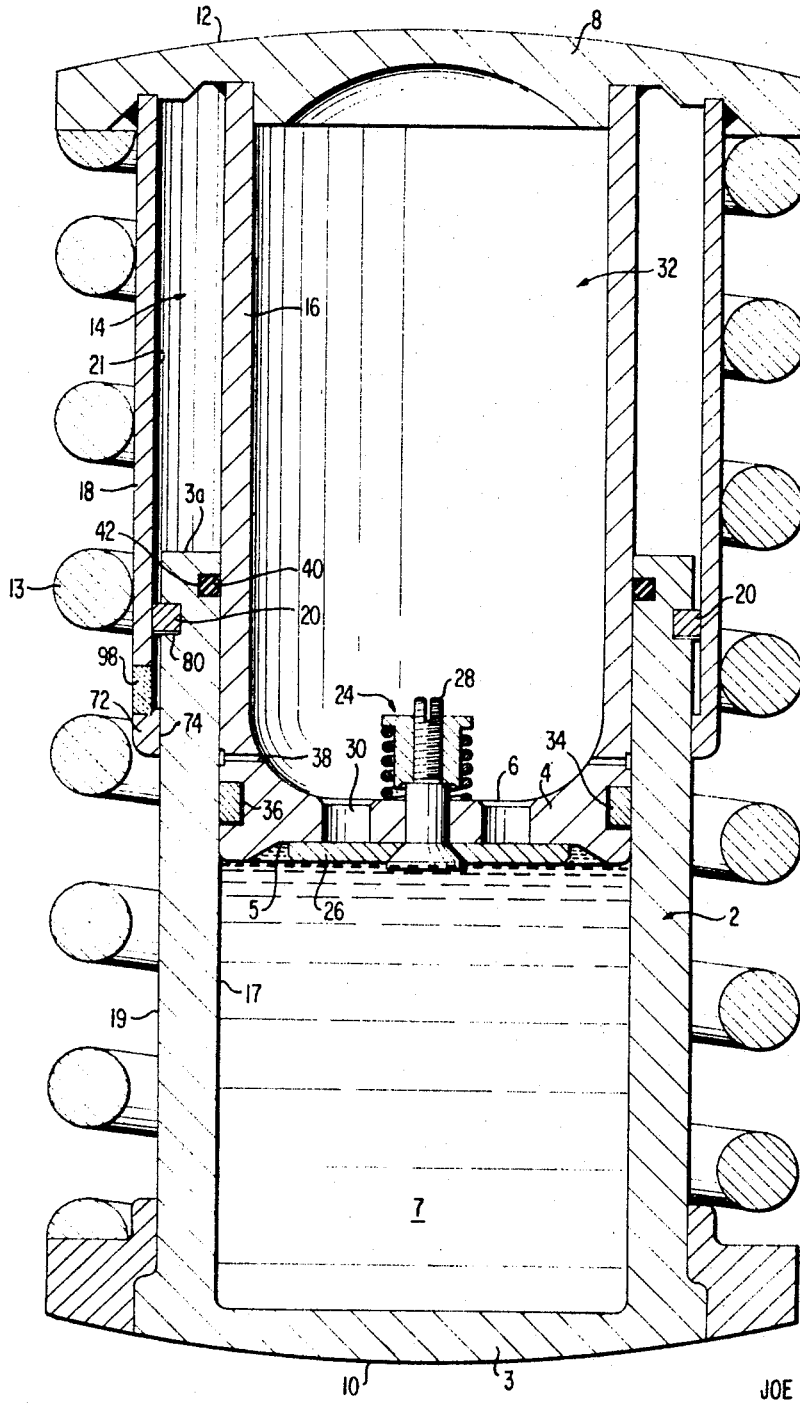
FIGURE 1 is a cross-sectional side view of a shock absorber according to one preferred embodiment of the invention.

Referring to FIGURE 1 of the drawings, one preferred embodiment of the invention there shown includes a vertically disposed, axially extending cylinder 2 having a closed lower extremity 3 and an open upper extremity defined by a free edge 3a. A piston 4 is received in the cylinder 2 for damped telescoping motion into a body of liquid 7 contained in the cylinder 2. The piston 4 is fixedly connected to an axially spaced upper cap 8 spaced outwardly of the cylinder. The piston 4 includes a high pressure, lower end 5 and a low pressure, upper end 6. The lower end 3 of the cylinder 2 and the upper cap 8 are provided with outwardly facing, convexly curved, spherical segment, mounting surfaces 10 and 12, respectively, adapted to permit rolling and sliding motion of the shock absorber relative to two mounting members (not shown) between which the shock absorber may be mounted in use. An axially extending restoring spring 13 extending about the cylinder 2 between the cap 8 and the lower end 3 of the cylinder 2 urges the piston 4 outwardly of the cylinder 2 to provide a restoring force after a load applied to the shock absorber has ceased to act. Insofar as the external structural configuration of the shock absorber, its method of mounting in a railway car, and the advantages of a shock absorber of this type for stabilizing railway cars against lateral sway are the same as those for the shock absorber described in the aforementioned Seay application, Ser. No. 582,970, reference should be made thereto for more detailed description of these aspects, such relavent disclosure being considered to be incorporated in the present application by reference.

A particularly significant feature of the present invention resides in the provision of a shroud, generally designated 14, fixedly connecting the piston 4 with the cap 8. The shroud 14 includes an axially extending inner wall 16 concentric with and slidably abutting an interior wall surface 17 of the cylinder 2 extending upwardly and outwardly thereof. The shroud 14 further includes a concentric outer wall 18 depending from the cap 8 with the lower portion of the outer wall overlapping and spaced radially outwardly from an exterior wall surface 19 of the cylinder 2. A plurality of bearing segments 20 project radially from and are spaced peripherally about the exterior wall surface 19 of the cylinder. The radially outer surfaces of the segments 20 slidingly abut an adjacent interior surface 21 of the outer wall 18 of the shroud 14. It will be appreciated that the shroud 14 provides guiding surfaces connected with the piston slidingly contacting opposite sides of the cylinder, thus providing particularly effective guidance and stabilization for the piston against non-axial, motions likely to cause binding or gouging of the piston and cylinder during damping motion. Moreover, the stabilizing structure provided is particularly rugged, leading to long unit life during severe operational use.

As will be apparent by reference to FIGURE 1 and from the preceding discussion, wall or guiding means 16 defines a piston rod-like structure projecting generally axially of piston head 4.

The radially outermost periphery of wall 16 defines a peripheral guiding surface extending axially of wall 17 for a distance at least as great as the increment of telescoping motion between the walls 16 and 17. This radially outermost periphery of wall 16 has a substantially uniform cross section throughout the axial extent of this distance, discounting of course minor irregularities such as gaskets, the aperture 38, etc. This outermost peripheral surface of wall 16 thus defines an axially extending, coextensive projection of the radially outermost periphery of the piston 4.

Figure 2:
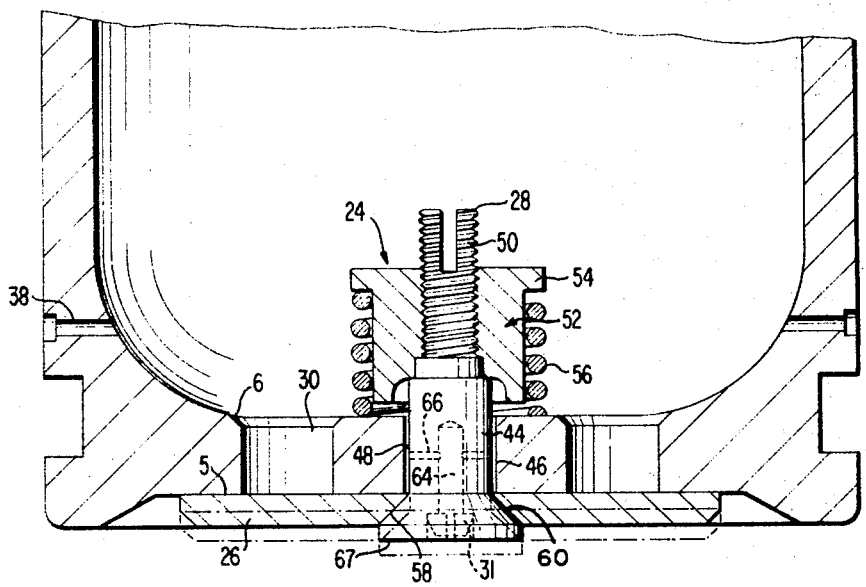
FIGURE 2 is a cross-sectional view on an enlarged scale of a restrictor pin and orifice forming a part of the invention shown in FIGURE 1.

The damping for the piston motion under load is provided by a restrictor unit, generally designated 24, which includes a plate like valve head 26 supported on the lower end of a spring biased rod 28. The rod 28 extends axially through the piston 4 for axial motion relative thereto. The rod 28 holds the valve head 26 in abutting sealing relation flush against the lower surface 5 of the piston 4 to close off passage of liquid through a plurality of spaced liquid return passages or channels 30 extending axially through the piston 4. The valve head 28 functions as a check valve in relation to the passages 30 and in a closed condition, with the piston advancing into the liquid the only passage for damping liquid from the high pressure side 5 of the piston to the low pressure side 6 is through a restricted metering orifice 31 (FIGURE 2) in the rod 28. The orifice 31 provides for damped motion of the piston into the cylinder at a predetermined rate. On restoration by the spring 13 after removal of the load, however, the rod 28 moves downwardly of the piston permitting the valve head 26 to open the passages 30 thus allowing rapid return motion of the piston.

It will be realized that the use of a combined check valve and metering orifice structure, with both aligned concentrically with the cylinder, minimizes off-center asymmetric damping forces, and in combination with the effect of the previously mentioned guiding structure, provides for particularly effectively stabilized piston travel.

Referring in more detail to FIGURE 1, the inner wall 16 at its lower end extends integrally into and blends with the piston 4 while at its upper end it is fixedly connected about its periphery to the previously mentioned top cap 8. The inner wall 16, the piston 4 and the adjacent portions of the cap 8 define a closed, cylindrical chamber 32 (which may be filled with air or may be under vacuum, as desired) functioning as a low-pressure cavity to receive damping fluid displaced through the restrictor unit 24.

To minimize passage of damping fluid between peripheral portions of the piston 4 and the interior wall surface 17 of the cylinder 2, an annular piston ring 34 is mounted in a peripheral groove 36 extending about the piston 4 with the ring 34 in sealing contact against the adjacent wall surface 17. In the event, however, that any hydraulic liquid should creep past the piston ring 34, a plurality of scavenge ports 38 extending radially through the wall 16 above the groove 36 are provided to permit the hydraulic fluid to drain into the low-pressure cavity 32.

An uper seal is also provided and includes an O-ring 40 mounted in a peripheral cavity 42 extending about the interior wall surface 17 of the cylinder 2 adjacent the upper end thereof, with the O-ring 40 in sealing abutting contact with the exterior of the wall 16.

The previously mentioned rod 28 (FIGURE 2) of the restrictor unit 24 includes a plain cylindrical shank 44 positioned within and spaced radially from a passage 46 extending concentrically, axially through the piston 4. The passage 46 and the exterior of the shank 44 define an axially extending annular channel 48 communicating with the low pressure cavity 32. Fixedly secured to the shank 44 extending upwardly therefrom into the interior of the low-pressure cavity 32 is a threaded portion 50 having mounted thereon a threaded nut 52. The nut 52 includes a radially projecting upper lip 54. A compression spring 56 extends between the lip 54 and the upper surface 6 of the piston 4 to bias the rod 28 upwardly into the low-pressure cavity. The lower end of the shank 44 is provided with a conically and downwardly flared portion 58 abuttingly and at all times continuously contacting a correspondingly configured conical recess 60 in the previously mentioned valve head 26.

The spring 56 urges the rod 28 upwardly to hold the valve head 26 flush against the lower surface 5 of the piston 4 thereby closing off entry of fluid to the annular channel 48 and to the passages 30. This closing effect is augmented during damped motion of the piston into the hydraulic liquid by the pressure of the hydraulic liquid acting against the lower face of the valve head 26.

To permit fluid to pass through the piston at a restricted rate during telescoping of the shock absorber under load, a restricted flow path is provided from the body of liquid 7 to the low pressure cavity 32. The restricted flow path includes an axial opening 64 in the rod 28 extending upwardly from a lower radial face 67 of the rod 28. The opening 64 is in fluid communication with two radially extending ports 66 in the rod 28 communicating with the annular channel 48. Interposed in the axial chanel 64 is the previously mentioned restricted orifice 31 fixedly secured in position by crimped over, adjacent portions of the lower radial face 67 of the rod 28. The orifice 31 is so dimensioned as to permit flow of liquid through the orifice 31 and the channels 64, 66 and 48 to the low pressure cavity 32 at a predetermined restricted rate sufficient to ensure the degree of cushioning required.

After the load causing telescoping of the shock absorber has ceased to act, the previously mentioned spring 13, which has become compressed during the period of operation of the load, exerts an expansive, restoring force moving the piston relatively outwardly of the cylinder. The upward motion of the piston in the liquid causes a partial vacuum acting on the lower surface of the valve head 26, which moves the valve head downwardly away from the lower surface 5 of the piston 4 to uncover the passages 30 so that the liquid displaced into the cavity 32 during action of the load may return rapidly to the body of liquid 7 below the piston. Eventually the piston reaches a neutral position in the cylinder in which it is no longer moved upwardly by the spring 13 at which time the partial vacuum on the lower surface of the valve head 26 ceases to act, so that the spring 56 may cause the rod 28 to restore the valve head 26 to its closed position flush against the piston.

It will be seen that the arrangement described conveniently combines the action of a check valve and a metering orifice and thereby permits damping of the piston motion relative to the cylinder during collapsing telescoping motion under load while at the same time permitting rapid restoration after the load has been removed.

The previously mentioned shroud 14 functioning as guiding and stabilizing means for the piston 4 further includes a radially inwardly projecting lip 72 positioned at the free extremity of the outer wall 18. The lip 72 includes an axially extending peripheral face 74 slidably abutting the exterior 19 of the cylinder 2 to provide guiding support for the outer wall in addition to that provided by the previously mentioned bearing segments 20. The segments 20 also act as a stop abutting the lip 72 in an extreme position of extension of the shock absorber, to prevent the piston from ever moving completely out of the cylinder.

It will be appreciated that the structure of the shock absorber described provides three separate, axially extending, bearing surfaces fixedly connected with the piston 4 to prevent non-axial motion thereof relative to the cylinder 2, namely: the axial sliding contact afforded between the lip 72 and the outer wall surface 19; the axial sliding contact afforded between the bearing segments 20 and the interior of the outer wall 18; and the axial sliding contact afforded between the exterior of the inner wall 16 and the interior wall surface 17. Not only does this arrangement ensure telescoping of the piston and cylinder stabilized against non-axial motions which might cause gouging or binding of the piston and cylinder, but moreover, it contributes substantially to the ruggedness of the shock absorber unit as a whole.

Figure 3:
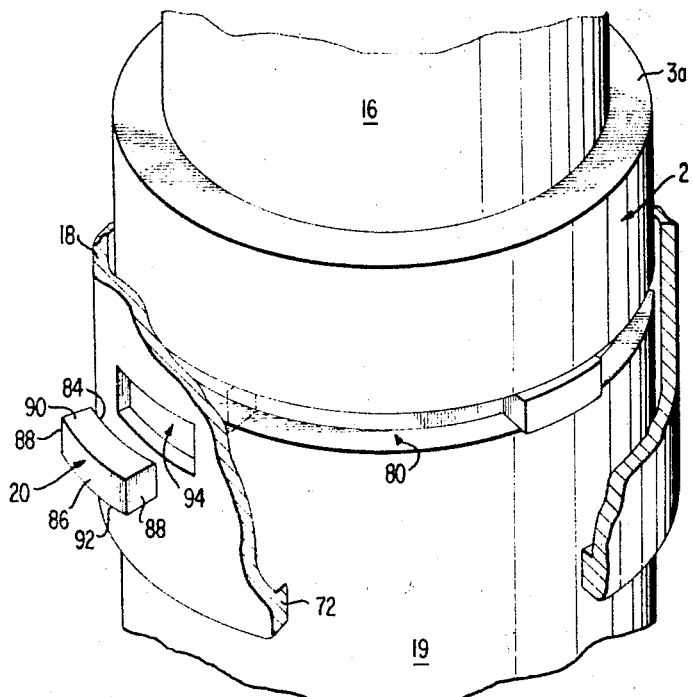
FIGURE 3 is a broken away, perspective view of a portion of the shock absorber shown in FIGURE 1 illustrating the method of mounting the bearing segments.

To receive the previously mentioned bearing segments 20 the outer wall surface 19 of the cylinder 2 adjacent the upper end thereof, is provided with a rectangular cross-section, peripherally extending channel 80. The bearing segments 20 (FIGURE 3) are positioned edge to edge about the groove 80. Each segment 20 includes an inner radial edge 84 curved to correspond to the peripheral curvature of the groove 80 and a curved, outer radial edge 86 spaced a sufficient distance from the inner radial edge 84 to slidingly abut the adjacent interior surface 21 of the outer wall 18 when the segment 20 is installed in the groove 80. Each segment 20 further includes two flat radially and vertically extending end faces 88 and parallel, horizontal, upper and lower surfaces 90 and 92. The thickness of the segments 20 is slightly less than the vertical extent of the groove 80 to permit slight axial motion therein to account for environmental discrepancies, limited thermal expansion and the like. To permit the segments 20 to be inserted in the groove 80, a rectangular window 94 extending arcuately for a short portion of the periphery of the outer wall 18, is provided adjacent the lower lip 72.

In a method for installing the bearing segments 20 the outer wall 18 is moved axially outwardly of the cylinder until the arcuate window 94 is visually aligned axially with the groove 80. The segments 20 are then inserted one at a time through the window 94. During such insertion, it is necessary to pass each segment axially through the window 94 into the groove 80 and then slide the segment peripherally along the groove 80 out of the way of the next segment 20 to be inserted. In performing this, it may be advisable to progressively turn the cap 8 to move the window about the cylinder to facilitate installation. After the last segment 20 has been inserted, a cover plate 98 (FIGURE 1) shaped to fit within the window 94 is placed therein and welded or otherwise secured in position.

It will be appreciated in constructing a shock absorber according to the present invention that certain significant advantages are provided.

In particular, the shroud guides and stabilizes the piston to effectively prevent non-axial fluttering or vibratory motions of the piston which might cause it to bind or gouge the cylinder walls.

In addition, the rugged construction of the shroud provides long unit life under harsh operational conditions.

Further significant is the depending lip on the shroud engaging the bearing ring during extreme extension of the shock absorber to prevent the piston coming out of the cylinder. Other advantages are provided by the restrictor unit including both a check valve and metering orifice so as to permit collapsing of the shock absorber at a controlled damping rate during application of loads and also to permit particularly rapid restoration of the shock absorber to its unloaded condition once the load was terminated.

What is claimed is:
1. A shock absorber comprising:
   cylinder means including:
      a cylinder wall having inner and outer peripheral surfaces and one open extremity defined by a free edge of said cylinder wall;
   piston means telescopingly received within said cylinder means,
   passage means in said piston means providing fluid communication between each of opposite axial ends of said piston means,
   said piston means having a high pressure end in engagement with a body of fluid and a low pressure end facing a cavity intended to receive fluid which passes from the high pressure end of said piston means through said passage means, pressure responsive restrictor means connected with said piston means adjacent said passage for increasing and decreasing flow through said passage means during motion of said piston means away from and toward said body of fluid respectively;

guiding means for guiding said piston means axially of said cylinder means, said guiding means including:
  an inner guide wall fixedly connected with said piston means concentric with and slidably abutting said inner surface of said cylinder wall,
  an outer guide wall concentric with and spaced outwardly from said inner guide wall fixedly connected therewith, said inner and outer walls defining an annular axial channel receiving said free edge of said cylinder wall,
  an annular groove peripherally extending in and about said outer surface of said cylinder wall,
  a window extending through said outer guide wall said window movable into axial alignment with said groove, and
  a plurality of arcuate bearing segments insertable separately through said window into said groove, said segments subsequent to insertion extending radially outwardly from said cylinder wall into snug sliding contact with adjacent portions of said outer guide wall; and two oppositely facing, convexly curved, mounting surfaces positioned at opposite ends of the shock absorber, one of said mounting surfaces fixedly connected with said piston means and the other of said mounting surfaces fixedly connected with said cylinder means, said mounting surfaces adapted to support the shock absorber between two relatively moving members to permit rolling and sliding movement of the shock absorber relative to the members.

2. A shock absorber as defined in claim 1 further including:
  stop means fixedly connected with said outer guide wall positioned longitudinally on a side of said bearing segments remote from said free edge of said cylinder wall, said stop means contacting at least one of said segments in an extreme position of extension of said piston outwardly of said cylinder means for preventing further outward motion of said piston from said cylinder means.

3. A shock absorber as defined in claim 1 wherein said passage means includes:
  at least one channel means extending through said piston means,
  said restrictor means including,
    rod means mounted in and extending through said piston means for motion axially thereof;
  a valve head connected with said rod means, said valve head movable to an open position spaced outwardly of said high pressure end of said piston means during motion of said piston means away from said body of fluid to permit flow through said channel means, said valve head movable to a closed position abutting said high pressure end in which said valve head prevents fluid entering said channel means from the body of fluid during motion thereinto of said piston means,
  an axially extending restricted duct in said rod means in fluid communication with said cavity and said body of fluid, said duct providing a relatively restricted flow path during motion of said piston means into said body of fluid, and
  spring means connected with said piston means and said rod for biasing said valve head to a closed position.

4. In a shock absorber of the type including cylinder means defined by a generally tubular wall having inner and outer peripheral surfaces and piston means telescopingly received within the generally tubular wall, the shock absorber further including passage means in the piston means providing fluid communication between each of opposite axial ends of the piston means, the piston means having a high pressure end in engagement with a body of fluid and a low pressure end facing a cavity intended to receive fluid which passes from the high pressure end of the piston means through the passage means, the improvement comprising:
  outer guiding means fixedly connected with the piston means extending axially in relation thereto, said outer guiding means continuously, telescopingly contacting the generally tubular wall along the outer peripheral surface thereof during an increment of axial telescoping motion of the piston means relative to the cylinder means;
  inner guiding means defining a piston rod fixedly connected with the piston means and extending axially from the low pressure end thereof, said inner guiding means having,
    a peripheral guiding surface disposed in intimate sliding contact with the inner peripheral surface of the cylindrical wall for the full axial extent of the telescoping range of motion of the piston means relative to the cylinder means to stabilize the piston means,
    said peripheral guiding surface extending axially of said generally tubular wall for a distance at least as great as said increment of telescoping motion and having a substantially uniform cross section throughout the axial extent of said distance, said peripheral surface further defining an axially extending, coextensive projection of the radially outermost periphery of said piston means,
  pressure responsive restrictor means connected with said piston means positioned adjacent said passage means for motion relative thereto, said restrictor means increasing and decreasing fluid flow through said passage means during motion of said piston means away from and into the body of fluid; and
  two oppositely facing, conversely curved, mounting surfaces positioned at opposite ends of the shock absorber one of said mounting surfaces fixedly connected with the piston means and the other of said mounting surfaces fixedly connected with the cylinder means,
  said mounting surfaces adapted to support the shock absorber between two relative moving members to permit rolling and sliding movement of the shock absorber relative to the members.

References Cited

UNITED STATES PATENTS

| | | |
|---|---|---|
| 2,095,112 | 10/1937 | Wallace. |
| 2,239,112 | 4/1941 | Nickelsen. |
| 2,915,046 | 12/1959 | Larsen et al. |
| 3,351,336 | 11/1967 | Blake _____ 105—199 X |

FOREIGN PATENTS

| | | |
|---|---|---|
| 1,111,528 | 11/1955 | France. |
| 329,500 | 5/1930 | Great Britain. |
| 668,543 | 3/1952 | Great Britain. |

OTHER REFERENCES 955, 114, December 1956, Germany, Printed Publication Fak 188/88.

GEORGE E. A. HALVOSA, *Primary Examiner.*

U.S. Cl. X.R.

92—108, 128; 105—197; 188—100